(12) United States Patent
Ohashi (10) Patent No.: US 11,072,069 B2
(45) Date of Patent: Jul. 27, 2021

(54) INSTALLATION MODE DETERMINATION DEVICE, COMPUTER PROGRAM AND RECORDING MEDIUM FOR DETERMINING INSTALLATION MODE

(71) Applicant: FANUC Corporation, Yamanashi (JP)

(72) Inventor: Toshinori Ohashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 80 days.

(21) Appl. No.: 16/360,036

(22) Filed: Mar. 21, 2019

(65) Prior Publication Data

US 2019/0314986 A1 Oct. 17, 2019

(30) Foreign Application Priority Data

Apr. 17, 2018 (JP) .............................. JP2018-079141

(51) Int. Cl.
*B25J 9/16* (2006.01)

(52) U.S. Cl.
CPC ... *B25J 9/1633* (2013.01); *G05B 2219/41388* (2013.01); *G05B 2219/50391* (2013.01)

(58) Field of Classification Search
CPC ...... B25J 9/1633; B25J 9/1638; B25J 9/1671; B25J 13/00; B25J 17/02; B25J 9/1674; G05B 2219/41388; G05B 2219/50391; G05B 2219/39194; Y10S 901/09
See application file for complete search history.

(56) References Cited

U.S. PATENT DOCUMENTS

| | | | |
|---|---|---|---|
| 2012/0277912 A1* | 11/2012 | Kirihara | B25J 9/1694 700/258 |
| 2015/0040712 A1 | 2/2015 | Yamaguchi | |
| 2016/0121484 A1* | 5/2016 | Ikeda | B25J 9/1674 700/256 |
| 2016/0327934 A1 | 11/2016 | Morimoto | |

FOREIGN PATENT DOCUMENTS

| | | |
|---|---|---|
| CN | 103056872 A | 4/2013 |
| CN | 105573249 A | 5/2016 |
| DE | 102010032871 A1 | 2/2012 |
| JP | H5-329792 A | 12/1993 |
| JP | H9-91004 A | 4/1997 |
| JP | 2004-345030 A | 12/2004 |

(Continued)

*Primary Examiner* — Robert T Nguyen
(74) *Attorney, Agent, or Firm* — Hauptman Ham, LLP (57) ABSTRACT

Provided is an installation mode determination device capable of determining an installation mode of an automatic machine.
The installation mode determination device acquires estimated torque that is required for maintaining a stationary state in which a position of an automatic machine that includes at least one axis that is driven by a servomotor is retained in a set installation mode among a plurality of installation modes applicable to the automatic machine, calculates actual torque that is actually provided by the servomotor for maintaining the stationary state, and determines whether the set installation mode and an actual installation mode of the automatic machine are different or not, based on a difference between the estimated torque corresponding to the set installation mode and the actual torque.

8 Claims, 8 Drawing Sheets

(56) References Cited

FOREIGN PATENT DOCUMENTS

| | | | |
|---|---|---|---|
| JP | 2011-212835 | A | 10/2011 |
| JP | 2011-235374 | A | 11/2011 |
| JP | 2016-87700 | A | 5/2016 |
| JP | 2016-209952 | A | 12/2016 |
| JP | 2002-166381 | A | 6/2020 |
| WO | 2013/161006 | A1 | 10/2013 |
| WO | 2017121635 | A1 | 7/2017 |
| WO | 2017199502 | A1 | 11/2017 |
| WO | 2018/113966 | A1 | 6/2018 |

* cited by examiner

INSTALLATION MODE DETERMINATION DEVICE, COMPUTER PROGRAM AND RECORDING MEDIUM FOR DETERMINING INSTALLATION MODE

RELATED APPLICATIONS

The present application claims priority of Japanese Application Number 2018-079141, filed Apr. 17, 2018, the disclosure of which is hereby incorporated by reference herein in its entirety.

FIELD

The present invention relates to, for example, an installation mode determination device and installation mode determination computer program that determines an installation mode of an automatic machine, and a recording medium that stores such an installation mode determination computer program.

BACKGROUND

To appropriately control an automatic machine, such as a robot or a machine tool, that has a movable part, such as an arm, that is driven by a servomotor, information that influences the dynamic characteristics of the movable part to be controlled is required to be set correctly. As such, a technique for determining, based on a difference between estimated torque that is required for retaining a position of an automatic machine and is calculated based on preset load information and actual torque that is actually provided to maintain the position, whether the load information is appropriately set, has been proposed (for example, refer to Japanese Unexamined Patent Publication (Kokai) No. 2016-87700).

In addition, a technique for estimating the position of a robot and torque of each axis thereof, based on each axis value, a torque command, and the like in a state where the robot is in a stationary position and, using the estimated result, estimating the weight of a load has been proposed (for example, refer to Japanese Unexamined Patent Publication (Kokai) No. 9-91004). Further, a technique for estimating the weight of a work and the position of the center of gravity thereof, based on a difference between a torque command transmitted to a motor without taking into account the weight of the work and torque that is actually generated in response to the weight of the gripped work has been proposed (for example, refer to Japanese Unexamined Patent Publication (Kokai) No. 2011-235374). Furthermore, a technique for positioning a heavy article gripping device at an appropriate position by moving and sliding it in a front and rear direction of a carriage advancing direction according to the kind of the gripped heavy article has been proposed (for example, refer to Japanese Unexamined Patent Publication (Kokai) No. 2004-345030).

SUMMARY

In an automatic machine, a load moment produced by gravity at an axis that is affected by gravity varies depending on its installation mode. As such, to appropriately control such an automatic machine, control information of the automatic machine that is set according to its installation mode may be used. Thus, information representing the installation mode of the automatic machine is required to be set correctly.

In an aspect, an objective is to provide an installation mode determination device capable of determining an installation mode of an automatic machine.

According to an embodiment, an installation mode determination device is provided. The installation mode determination device includes: a processor configured to: acquire estimated torque that is required for maintaining a stationary state in which a position of an automatic machine that includes at least one axis that is driven by a servomotor is retained in a set installation mode among a plurality of installation modes applicable to the automatic machine; calculate actual torque that is actually provided by the servomotor for maintaining the stationary state; and determine whether the set installation mode and an actual installation mode of the automatic machine are different or not, based on a difference between the estimated torque corresponding to the set installation mode and the actual torque.

According to another embodiment, a non-transitory recording medium that stores an installation mode determination computer program is provided. The installation mode determination computer program causes a computer to execute: acquiring estimated torque that is required for maintaining a stationary state in which a position of an automatic machine that includes at least one axis that is driven by a servomotor is retained in a set installation mode among a plurality of installation modes applicable to the automatic machine; calculating actual torque that is actually provided by the servomotor for maintaining the stationary state; and determining whether the set installation mode and the actual installation mode of the automatic machine are different, based on a difference between the estimated torque and the actual torque corresponding to the set installation mode.

According to still another embodiment, an installation mode determination device is provided. The installation mode determination device includes: a processor configured to: acquire, for each of a plurality of installation modes applicable to an automatic machine that includes at least one axis that is driven by a servomotor, estimated torque that is required for maintaining a stationary state in which a position of the automatic machine is retained; calculate actual torque that is actually provided by the servomotor for maintaining the stationary state; calculate, for each of the plurality of installation modes, an absolute value of a difference between the estimated torque in the installation mode and the actual torque; and estimate an installation mode with a smallest absolute value of the difference among the plurality of installation modes as an actual installation mode of the automatic machine.

According to still another embodiment, a non-transitory recording medium that stores an installation mode determination computer program is provided. The installation mode determination computer program causes a computer to execute: acquiring, for each of a plurality of installation modes applicable to an automatic machine that includes at least one axis that is driven by a servomotor, estimated torque that is required for maintaining a stationary state in which a position of the automatic machine is retained; calculating actual torque that is actually provided by the servomotor for maintaining the stationary state; calculating, for each of the plurality of installation modes, an absolute value of a difference between the estimated torque in the installation mode and the actual torque; and estimating an installation mode with a smallest absolute value of the difference among the plurality of installation modes as an actual installation mode of the automatic machine.

According to an aspect, the installation mode of an automatic machine can be determined.

DESCRIPTION OF EMBODIMENTS

The following will describe an installation mode determination device and an installation mode determination computer program that is used in the installation mode determination device with reference to the drawings. This installation mode determination device determines whether or not a set installation mode differs from an actual installation mode, with regard to an axis of an automatic machine of which load moment produced by gravity differs depending on an installation mode, according to a difference between an estimated value of torque (hereinafter, referred to as estimated torque) that is provided to the axis for maintaining an automatic machine in a stationary state in an installation mode set by a user (hereinafter, simply referred to as a stationary state) and actual torque that is provided to the axis for maintaining the automatic machine in the stationary state (hereinafter, referred to as actual torque). Note that the stationary state of the automatic machine refers to a state where the position of the automatic machine is temporarily retained by output torque from a servomotor that provides torque to axes of joints of the automatic machine in a state where a separate braking means such as a brake is not operating.

Figure 1:
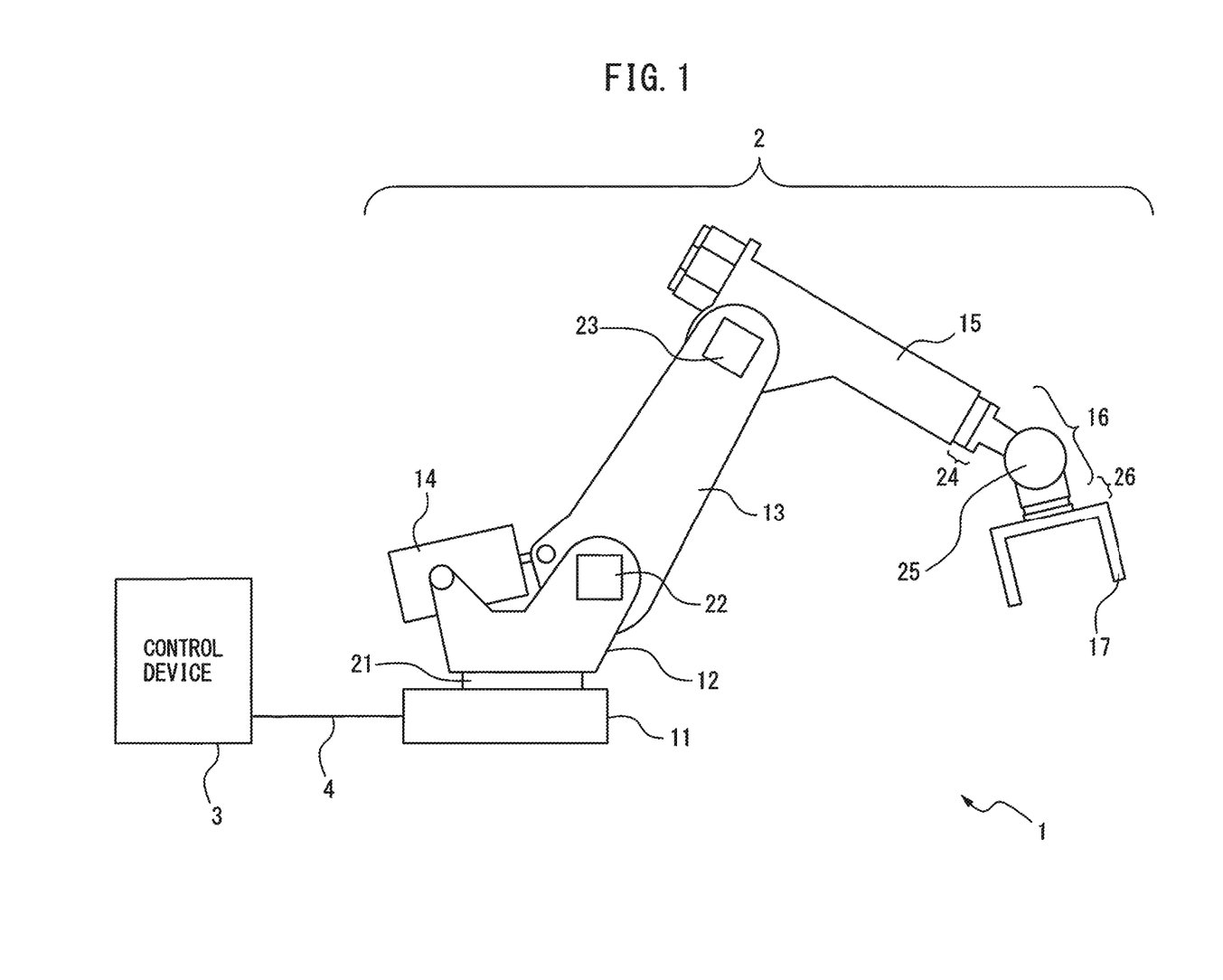
FIG. 1 is a schematic structure view of a robot system including a control device according to an embodiment of an installation mode determination device.

FIG. 1 is a schematic structure view of a robot system 1 including a control device according to an embodiment of the installation mode determination device. The robot system 1 includes a robot 2 and a control device 3 that controls the robot 2. The robot 2 is an example of an automatic machine of which installation mode is to be determined. Further, the control device 3 is an example of the installation mode determination device.

The robot 2 is a six-axis vertical multi-joint robot that has a pedestal 11, a rotary stage 12, a first arm 13, a balancer 14, a second arm 15, a wrist 16, and a hand 17. The rotary stage 12, the first arm 13, the second arm 15, the wrist 16, and the hand 17 are examples of movable parts. Further, the rotary stage 12, the first arm 13, the second arm 15, the wrist 16, and the hand 17 are respectively supported by axes provided by joints to which the rotary stage 12, the first arm 13, the second arm 15, the wrist 16, and the hand 17 are attached, and operate by driving the axes by using a servomotor.

The pedestal 11 is a member that serves as a base when the robot 2 is installed on a floor. The rotary stage 12 is attached on one surface of the pedestal 11 (for example, the top surface of the pedestal 11 when the robot 2 is installed on a floor) in a rotatable manner about an axis (not illustrated) provided by a joint 21, as a rotation center, which is perpendicular to the surface of the pedestal 11.

The first arm 13 is attached, at its one end, to the rotary stage 12 through the joint 22 provided on the rotary stage 12. In the present embodiment, as illustrated in FIG. 1, the first arm 13 is rotatable at the joint 22 about an axis (not illustrated) that is provided in parallel to a surface of the pedestal 11 to which the rotary stage 12 is attached.

The balancer 14 is fixed to the rotary stage 12 in a manner opposing to the first arm 13. The balancer 14 is further connected, at its one end, to the first arm 13. Then, the balancer 14 generates force in a direction of pulling the first arm 13 or in a direction of pressing down the first arm 13 by a spring (not illustrated) provided inside the balancer 14 or compressed air filled inside the balancer 14 (hereinafter, referred to as the balancer force) so that the position of the robot 2 is stable and provides the balancer force to the first arm 13. For example, when the robot 2 is installed on a floor, the balancer 14 generates balancer force in a direction of pulling the first arm 13. With the balancer force, it is expected that the influence of gravity applied to the first arm 13 and the leading end side of the first arm 13 on the load of the joint 22 of the robot 2 is alleviated.

The second arm 15 is, at its one end side, attached to the first arm 13 by a joint 23 provided on the other end side of the first arm 13 on the opposite side to the joint 22. In the present embodiment, as illustrated in FIG. 1, the second arm 15 is rotatable at the joint 23 about an axis (not illustrated) provided in parallel to the surface of the pedestal 11 to which the rotary stage 12 is attached.

The wrist 16 is attached, through a joint 24, to the leading end of the second arm 15 on the opposite side to the joint 23. In the present embodiment, the wrist 16 is rotatable on a surface perpendicular to the longitudinal direction of the second arm 15 about an axis (not illustrated) in parallel to the longitudinal direction of the second arm 15 as a rotation center.

Further, the wrist 16 has a joint 25 and is bendable at the joint 25 about an axis (not illustrated) provided in parallel to the axis of the joint 22 and the axis of the joint 23.

The hand 17 is a grip member for holding a work object and is attached through a joint 26 to the leading end of the wrist 16 on the opposite side to the joint 24. In the present embodiment, the hand 17 is rotatable, along the leading end surface of the wrist 16, about an axis (not illustrated) provided to be perpendicular to the leading end surface as a rotation axis.

Note that the automatic machine to which installation mode determination processing is applied may be an automatic machine that includes at least one axis driven by a servomotor and at least one movable part supported by the axis without limitation to the robot 2 illustrated in FIG. 1.

The control device 3 is connected to the robot 2 through a communication line 4 and controls the location and position of the robot 2 by outputting control commands to the servomotor that drives axes provided by respective joints of the robot 2.

Figure 2A:
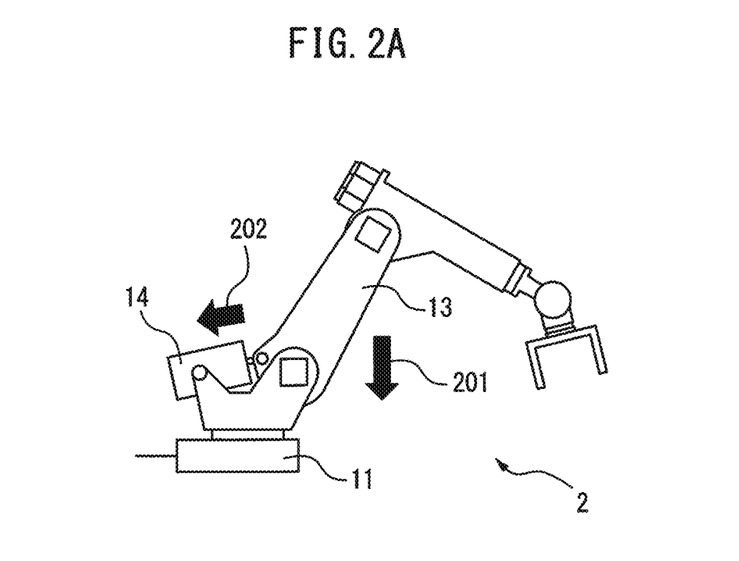
FIG. 2A is a diagram representing the direction of gravity when a robot is installed on a floor.
Figure 2B:
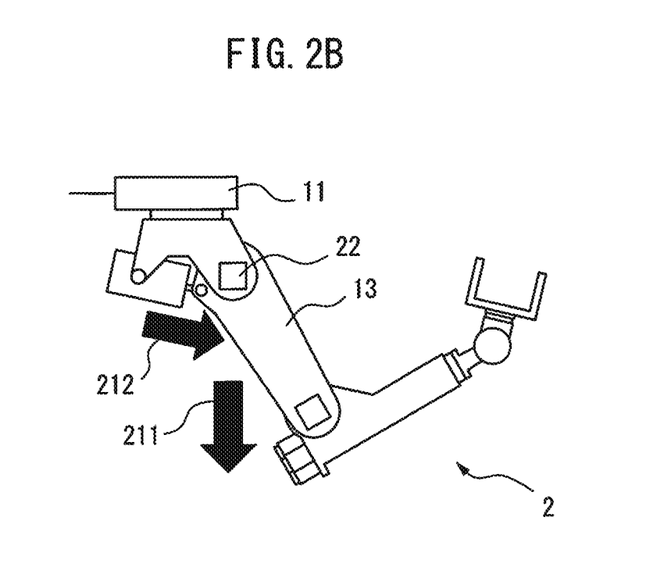
FIG. 2B is a diagram representing the direction of gravity when the robot is installed suspended from a ceiling.
Figure 2C:
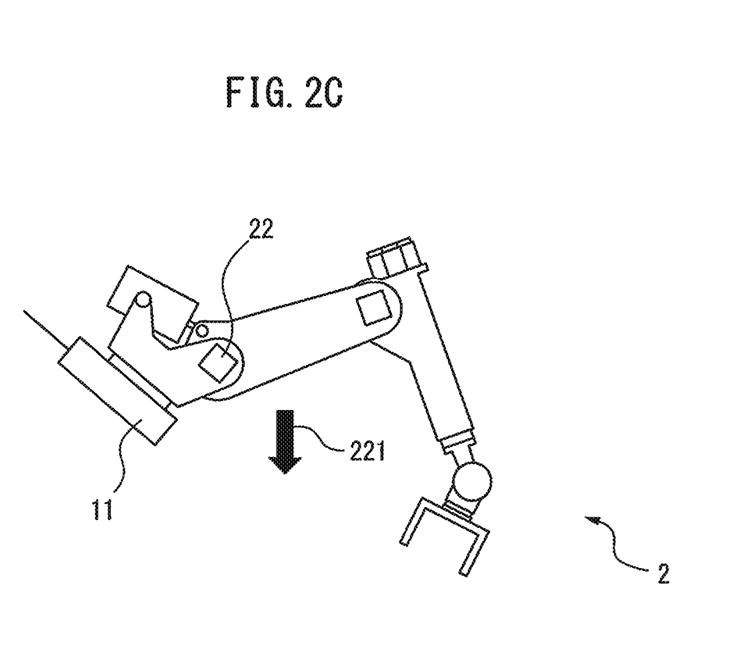
FIG. 2C is a diagram representing the direction of gravity when the robot is installed with an inclination angle.

With reference to FIGS. 2A to 2C, a corresponding relationship between an installation mode of the robot 2 and a load moment due to gravity will be described. FIG. 2A is a diagram representing the direction of gravity when the robot 2 is installed on a floor. FIG. 2B is a diagram representing the direction of gravity when the robot 2 is installed suspended from a ceiling. FIG. 2C is a diagram representing the direction of gravity when the robot 2 is installed with an inclination angle.

As illustrated in FIG. 2A, when the robot 2 is installed on a floor, gravity toward the floor surface, i.e., in a direction toward the side of the pedestal 11 is applied to each part of the robot 2. For example, gravity in a direction toward the side of the pedestal 11 as indicated by the arrow 201 is applied to the first arm 13 and each part located on a more leading end side than the first arm 13. As such, a load moment in a clockwise direction in FIG. 2A is applied to the axis of the joint 22 that supports the first arm 13. Further, the balancer 14 provides balancer force that pulls the first arm 13 along the direction indicated by the arrow 202 to the first arm 13 to alleviate an influence of gravity on the first arm 13 and each part located on a more leading end side than the first arm 13. Thus, to maintain the robot 2 in a stationary state, it is required that torque that offsets a difference obtained by subtracting the balancer force of the balancer 14 from the load moment due to gravity that is applied to the first arm 13 and each part located on a more leading end side of the first arm 13 is applied to the axis of the joint 22.

As illustrated in FIG. 2B, when the robot 2 is installed suspended from a ceiling, gravity in a direction away from the side of the pedestal 11 is applied to each part of the robot 2. For example, gravity in a direction apart from the pedestal 11 as indicated by the arrow 211 is applied to the first arm 13 and each part located on a more leading end side than the first arm 13. Thus, a load moment in the opposite direction to the direction of a load moment when the robot 2 is installed on a floor is applied to the axis of the joint 22 that supports the first arm 13. In such a case, the balancer 14 preferably provides balancer force that pushes the first arm 13 along the direction indicated by the arrow 212 to the first arm 13 to alleviate an influence of gravity applied to the first arm 13 and each part located on a more leading end side than the first arm 13. Thus, when the robot 2 is installed suspended from a ceiling, a direction in which the balancer force generated by the balancer 14 is provided is preferably an opposite direction to a direction in which the balancer force generated by the balancer 14 is provided when the robot 2 is installed on a floor. Further, to maintain the robot 2 in a stationary state, the output direction relating to the direction of the rotation of torque (hereinafter, simply referred to as an output direction) that is provided to the axis of the joint 22 when the robot 2 is installed suspended from a ceiling is preferably an opposite direction to the output direction of torque that is provided to the axis of the joint 22 when the robot 2 is installed on a floor.

As illustrated in FIG. 2C, when the robot 2 is installed such that the surface of the pedestal 11 facing a floor surface in a floor installation is inclined in relation to the floor surface, i.e., when the robot 2 is installed with an inclination angle, gravity in a direction toward the floor surface is applied to each part of the robot 2, as indicated by the arrow 221. In contrast to a direction in which gravity is applied in a floor installation or in a suspension installation, in this case, a direction in which gravity is applied, with reference to the robot 2, forms an angle corresponding to the inclination angle of the robot 2. Thus, to maintain the robot 2 in a stationary state when the robot 2 is installed with an inclination angle, the torque that is provided to the axis of the joint 22 of the robot 2 is different from torque that is provided to the axis of the joint 22 of the robot 2 when the robot 2 is installed on a floor or suspended from a ceiling. Note that the range of the inclination angle applicable to the robot 2 may be set, for example, in advance according to the specification of the robot 2.

As described above, the magnitude or direction of torque that is provided to the axis of the joint 22, which is required to maintain the robot 2 in a stationary state varies according to the installation mode of the robot 2. Likewise, with regard to the axes of other joints of the robot 2, the magnitude or direction of provided torque that is required to maintain the robot 2 in a stationary state varies according to the installation mode of the robot 2. Thus, in an installation mode that is set by a user with regard to the robot 2, the control device 3 can determine whether or not the set installation mode differs from the actual installation mode by comparing estimated torque that is required to maintain the robot 2 in a stationary state and actual torque output from the servomotor to maintain the robot 2 in a stationary state.

Figure 3:
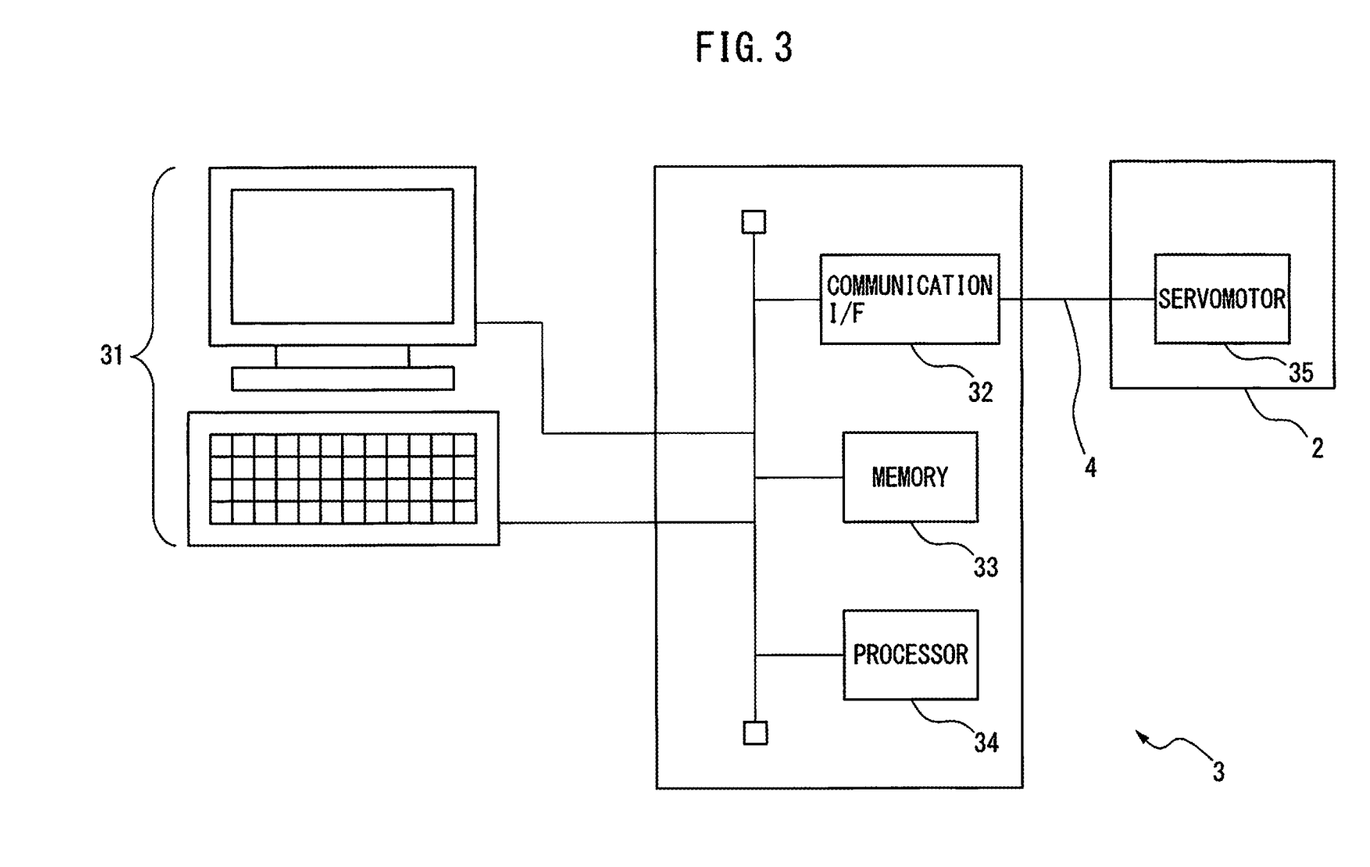
FIG. 3 is a schematic structure view of the control device according to an embodiment of the installation mode determination device.

FIG. 3 is a schematic structure view of the control device 3. The control device 3 includes a user interface 31, a communication interface 32, a memory 33, and a processor 34.

The user interface 31 is an example of a notification unit and includes, for example, a touch panel. The user interface 31 generates an operation signal according to an operation by a user, for example, a signal relating to setting of an installation mode, and outputs the operation signal to the processor 34. In addition, the user interface 31 displays a determination result of the installation mode in accordance to a signal for display received from the processor 34. Note that the user interface 31 may separately include an input device such as a keyboard or a mouse for inputting operation signals and a display device such as a liquid crystal display.

The communication interface 32 includes, for example, a communication interface for connecting the control device 3 to the communication line 4 and a circuit for executing processing relating to transmission and reception of signals through and the communication line 4. The communication interface 32 outputs, for example, a torque command value or the like for the servomotor 35 of the robot 2, which is received from the processor 34, to the robot 2 through the communication line 4. Further, the communication interface 32 receives information representing the operation state of the servomotor 35, such as a feedback current value of the servomotor 35, from the robot 2 through the communication line 4 and passes the information to the processor 34. Note that, although a single servomotor 35 is illustrated as a representative example in FIG. 3, the robot 2 may include, for each joint, a servomotor for driving the axis of the joint.

The memory 33 is an example of a storage unit and includes, for example, a readable and writable semiconductor memory and a read-only semiconductor memory. The memory 33 may further include a recording medium, such as a semiconductor memory card, a hard disk, or an optical recording medium, and a device that accesses the recording medium.

The memory 33 stores a variety of programs for controlling the robot 2, a computer program for installation mode determination processing, and the like, which are executed by the processor 34 of the control device 3. The memory 33 also stores control information of the robot 2 in each installation mode (for example, an output direction and torque of the servomotor 35 for retaining the robot 2 in each installation mode, an allowable rotation range of the servomotor 35 in each installation mode, correction information of torque according to a load moment due to gravity for operating each movable part), estimated torque required for maintaining the robot 2 in a stationary state with regard to the axis of each joint of the robot 2 that is used for determining the installation mode, and information that specifies the installation mode of the robot 2 that is set by a user. The memory 33 further stores information representing the operation state of the servomotor 35 that is obtained from the robot 2 during operation of the robot 2, a variety of data generated while the installation mode determination processing is executed, the result of the installation mode determination processing, and the like.

The estimated torque provided to the axis of each joint is calculated in accordance with a known method, for example, based on an installation mode of the robot 2, a predetermined position of the robot 2 in the installation mode when the robot 2 is installed, mechanical parameters of the joint of the robot 2 and each part located on a more leading end side than the joint (length from the supported axis, mass, a friction coefficient, and the like, these parameters are known), balancer force produced by the balancer 14, load information, such as the mass and center of gravity of a load that is applied to the robot 2, and the like.

Alternatively, estimated torque provided to the axis of each joint in each installation mode may be calculated in advance from a torque command to the servomotor 35 that provides torque to the axis of the joint in order to maintain the robot 2 in a stationary state, when the robot 2 is actually installed in accordance with the installation mode. Note that the positive/negative of the estimated torque may be oppositely represented according to the output direction of the servomotor 35. For example, when the output direction of the servomotor 35 that provides torque for maintaining the robot 2 in a stationary state is a forward rotation direction, the estimated torque is represented as a positive value, and, when the output direction of the servomotor 35 that provides torque for maintaining the robot 2 in a stationary state is a reverse rotation direction, the estimated torque may be represented as a negative value.

The processor 34 is an example of a control unit and includes, for example, a central processing unit (CPU) and a peripheral circuit. The processor 34 may further include a processor for arithmetic operation. The processor 34 controls the entire robot system 1. In addition, the processor 34 executes processing relating to setting of the installation mode of the robot 2 and installation mode determination processing.

As the processing relating to setting of an installation mode, when the robot 2 is installed on a production line of a factory or the like, for example, the processor 34 causes the user interface 31 to display a plurality of installation modes applicable to the robot 2. When a user performs an operation of selecting an installation mode of the robot 2 from among displayed installation modes through the user interface 31, the user interface 31 generates an operation signal according to the operation and outputs the signal to the processor 34, the processor 34 stores information specifying the installation mode (for example, a flag where the set installation mode and other installation modes have different values) set by the user in the memory 33 in accordance to the received operation signal.

Continued from the processing relating to setting of an installation mode, or after the processing relating to setting of an installation mode, when the robot 2 is activated in order to determine whether the installation of the robot 2 is normal or not, upon initial activation of the robot 2 for operation, or each time the control device 3 is activated, the processor 34 executes installation mode determination processing in accordance with the installation mode determination computer program that the processor 34 reads from the memory 33.

Figure 4:
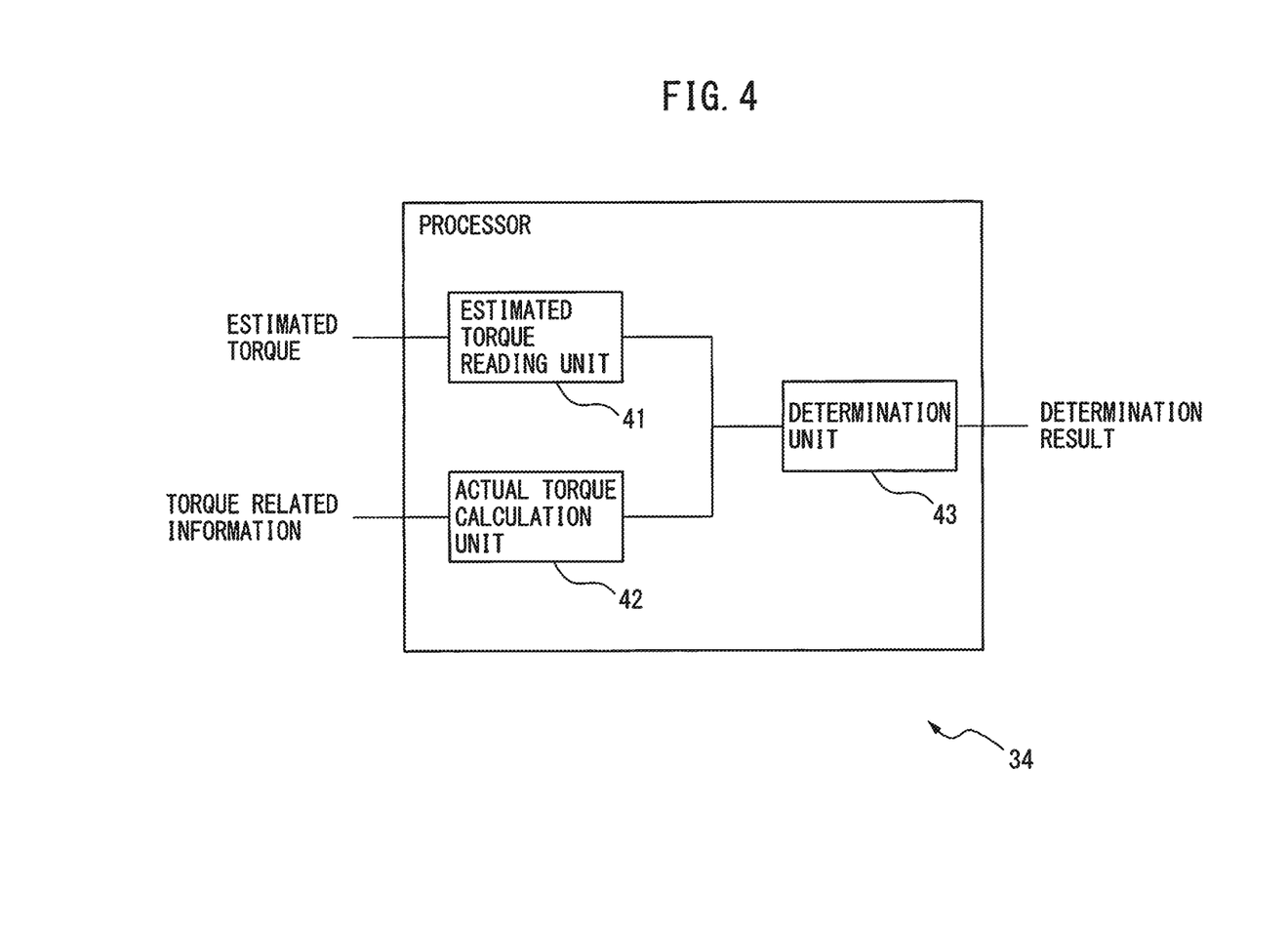
FIG. 4 is a functional block view of a processor of the control device.

FIG. 4 is a functional block view of the processor 34 relating to the installation mode determination processing. The processor 34 includes an estimated torque reading unit 41, an actual torque calculation unit 42, and a determination unit 43. These units of the processor 34 are, for example, functional modules that are realized by a computer program executed on the processor 34. Alternatively, these units may be implemented as a dedicated arithmetic circuit that is implemented by part of the processor 34.

The estimated torque reading unit 41, which is an example of an estimated torque acquisition unit, refers to information representing an installation mode that is set by a user with regard to an axis of a joint that is used for determining the installation mode of the robot 2, and reads a value of estimated torque with regard to the axis of the joint in the set installation mode from the memory 33. Note that the axis of the joint used for determining an installation mode is preferably, for example, an axis where the absolute value of a load moment due to gravity applied to the axis of the joint is relatively large. Further, the position of the robot 2 of which installation mode is to be determined is preferably set such that an extended direction from the axis of a portion supported by the axis of the joint that is used for determining the installation mode is not parallel to a direction in which gravity is applied. For example, for the robot 2, the axis of the joint 22 that supports the first arm 13 is set in advance as an axis of a joint that is used for determining an installation mode where an extension direction of the first arm 13 in a position defined for each installation mode differs from each other and the extension direction of each position differs from a direction in which gravity is applied. Further, the axis of the joint 23 that supports the second arm 15 or the axis of the joint 25 of the wrist 16 may be set in advance as an axis that is used for determining an installation mode. In this way, since the value or direction of torque, which is provided to the axis of the joint, for maintaining the robot 2 in a stationary state is different depending on an installation mode, the control device 3 can correctly determine the installation mode of the robot 2.

The estimated torque reading unit 41 delivers the read estimated torque value to the determination unit 43.

The actual torque calculation unit 42 calculates, with regard to the axis of the joint that is used for determining the installation mode of the robot 2, actual torque that is output from the servomotor 35 for actually maintaining the robot 2 in a stationary state. Note that, when the actual torque is calculated, for example, the servomotor 35 is instructed to maintain a stationary state by the processor 34 in accordance with a computer program for installation mode determination processing. For example, the actual torque calculation unit 42 may calculate actual torque in accordance with a known method, based on torque-related information, such as a feedback current of the servomotor 35 that provides torque to the axis of the joint that is used for determining the installation mode of the robot 2 and a torque constant of the servomotor 35, and mechanical parameters of the axis of the joint and a part that is supported by the axis. Note that, since the torque constant varies according to a condition, the actual torque calculation unit 42 may adjust the torque constant as necessary, such as, based on temperature information that is separately acquired. Further, the actual torque calculation unit 42 may calculate actual torque for each position of the robot 2 during operation, based on torque-related information such as a feedback current of the servomotor 35 during operation of the robot 2. In this way, the control device 3 can determine the installation mode of the robot 2 even during the operation of the robot 2.

Further, the actual torque calculation unit 42 may calculate actual torque, based on a torque command to the servomotor 35. In this way, since the actual torque calculation unit 42 calculates the actual torque using operation information of the servomotor 35 or a torque command to the servomotor 35, a separate sensor for acquiring actual torque may be omitted.

Note that, when a torque sensor for measuring torque that is output from the servomotor 35 is provided, the actual torque calculation unit 42 may calculate the actual torque, based on a measurement result by the torque sensor. In such a case, the actual torque calculation unit 42 can accurately calculate the actual torque without being affected by the influence of fluctuation of the torque constant.

Note that, in the same way as the estimated torque, the positive/negative of the actual torque may be oppositely represented according to the output direction of the servomotor. For example, when the output direction of the servomotor 35 that provides torque for maintaining the robot 2 in a stationary state is a forward rotation direction, the actual torque is represented as a positive value, on the other hand, when the output direction of the servomotor 35 that provides torque for maintaining the robot 2 in a stationary state is a reverse rotation direction, the actual torque may be represented as a negative value.

The actual torque calculation unit 42 delivers the calculated actual torque to the determination unit 43.

The determination unit 43 calculates, with regard to the axis of the joint that is used for determining the installation mode of the robot 2, the absolute value of a difference between the actual torque and the estimated torque as an error between the actual torque and the estimated torque. Then, when the error between the actual torque and the estimated torque is not less than a predetermined threshold, the determination unit 43 determines that information relating to the set installation mode is incorrect or that the robot 2 is not installed as set, i.e., the actual installation mode of the robot 2 is different from the set installation mode. Whereas, when the error between the actual torque and the estimated torque is less than a predetermined threshold, the determination unit 43 determines that information relating to the set installation mode is correct, i.e., the actual installation mode of the robot 2 is the same as the set installation mode. Note that the predetermined threshold can be, for example, the maximum permissible error of the estimated torque in the set installation mode. In this way, the determination unit 43 can accurately determine whether the set installation mode and the actual installation mode are different or not.

The determination unit 43 causes the user interface 31 to display information representing the determination result. Note that, when a determination result that information relating to the set installation mode is incorrect is obtained, for example, the determination unit 43 may causes the user interface 31 to display information representing the determination result in a display mode that attracts user's attention, such as flashing on and off information representing the determination result. In this way, when information relating to the installation mode set by a user is incorrect, the determination unit 43 makes a user easily recognize the mistake, thereby preventing the robot 2 from operating based on information relating to a falsely set installation mode. As the result, the control device 3 can prevent the robot 2 from performing an unexpected behavior to enhance safety.

Further, when the determination result that information relating to the set installation mode is incorrect is obtained, the determination unit 43 may calculate, with regard to each of installation modes other than the set installation mode, an error between the estimated torque in the installation mode and the actual torque. Then, the determination unit 43 may estimate an installation mode with the smallest error as an installation mode that is actually adapted to the robot 2 among the installation modes, and cause the user interface 31 to display the information representing the estimated installation mode. The determination unit 43 may also cause the user interface 31 to display information representing an installation mode set by a user together with information representing the estimated installation mode. In this way, the determination unit 43 can easily notify a user that the set installation mode is different from the actual installation mode.

Furthermore, when the determination result that information relating to the set installation mode is incorrect is obtained, the processor 34 may restrict the operation of the robot 2. For example, the processor 34 may restrict the movable range of a part supported by the axis of any one or more joints among the joints of the robot 2. Alternatively, the processor 34 may restrict the output torque from the servomotor 35 for driving the axis of any one or more joints among the joints of the robot 2 within a predetermined range.

In this way, the control device 3 can prevent occurrence of an accident due to the use of information relating to an incorrect installation mode.

Figure 5:
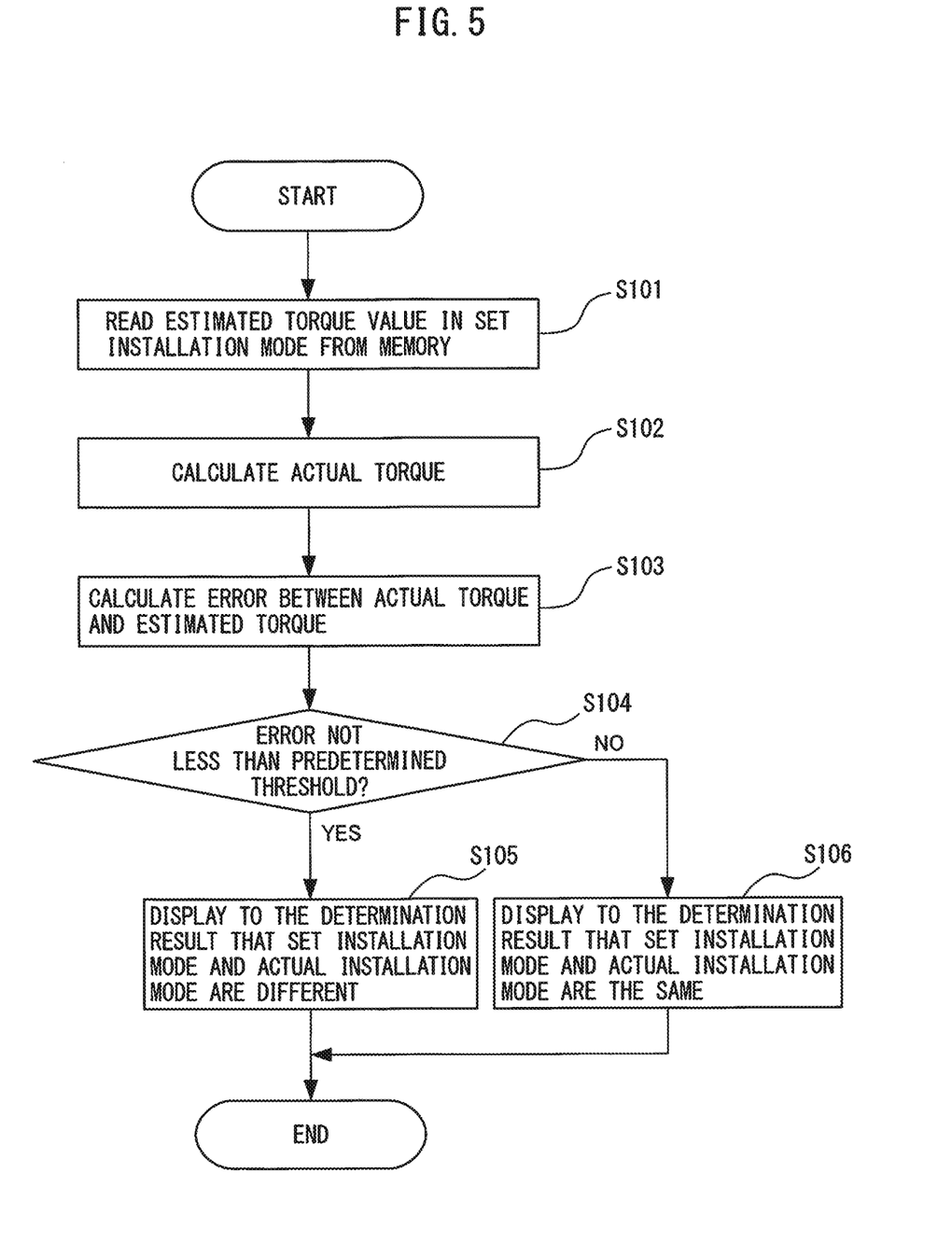
FIG. 5 is an operational flowchart of installation mode determination processing.

FIG. 5 is an operational flowchart of the installation mode determination processing. The processor 34 executes the installation mode determination processing in accordance with the following operational flowchart.

With regard to an axis of a joint that is used for determining an installation mode of the robot 2, the estimated torque reading unit 41 reads a value of estimated torque for the axis of the joint in an installation mode set by a user from the memory 33 (step S101). In addition, with regard to the axis of the joint that is used for determining the installation mode of the robot 2, the actual torque calculation unit 42 calculates actual torque that is output from the servomotor 35 for actually maintaining the robot 2 in a stationary state (step S102).

The determination unit 43 calculates an error between the actual torque and the estimated torque (step S103). The determination unit 43, then, determines whether the error between the actual torque and the estimated torque is not less than a predetermined threshold or not (step S104).

When the error between the actual torque and the estimated torque is not less than the predetermined threshold (Yes at step S104), the determination unit 43 determines that the information relating to the set installation mode is incorrect, i.e., the set installation mode and the actual installation mode are different. Then, the determination unit 43 causes the user interface 31 to display the determination result representing that the set installation mode is different from the actual installation mode (step S105).

On the other hand, when the error between the actual torque and the estimated torque is less than a predetermined threshold (No at step S104), the determination unit 43 determines that information relating to the set installation mode is correct, i.e., the set installation mode is the same as the actual installation mode. Then, the determination unit 43 causes the user interface 31 to display the determination result representing that the set installation mode is the same as the actual installation mode (step S106).

After step S105 or S106, the processor 34 ends the installation mode determination processing. Note that the order of the processing of step S101 and the processing of step S102 may be switched.

As described above, the installation mode determination device determines whether a set installation mode and an actual installation mode are the same or not, based on a difference between estimated torque for maintaining an automatic machine in a stationary state corresponding to a set installation mode and actual torque for actually maintaining the automatic machine in a stationary state. Thus, the installation mode determination device can appropriately determine whether the information set relating to the installation mode of the automatic machine is correct or not and inform a user of the determination result. Accordingly, the installation mode determination device can prevent the automatic machine from performing an unexpected behavior due to a setting error of a user, as well as, prevent occurrence of accidents.

Further, to maintain the robot 2 in a stationary state, the output direction of the servomotor 35 may differ from each installation mode of the robot 2. For example, as illustrated in FIG. 2A, the output direction of the servomotor 35 that drives the axis of the joint 22 for maintaining the robot 2 in a stationary state when the robot 2 is installed on a floor and, as illustrated in FIG. 2B, the output direction of the servomotor 35 that drives the axis of the joint 22 for maintaining the robot 2 in a stationary state when the robot 2 is installed suspended from a ceiling are opposite directions to each other.

Thus, according to a variation, the determination unit 43 may determine, with regard to an axis of a joint that is used for determining an installation mode of the robot 2, that the set installation mode of the robot 2 and the actual installation mode of the robot 2 are different when the direction of the estimated torque and the direction of the actual torque differ from each other. According to this variation, since the determination unit 43 only have to compare the direction of the estimated torque and the direction of the actual torque, the determination unit 43 can determine more easily whether information set relating to the installation mode of the robot is correct or not.

According to another variation, the processor 34 may determine an installation mode, based on an error between actual torque and estimated torque or a difference of the directions of the actual torque and the estimated torque for respective axes of two or more joints among a plurality of joints of the robot 2. In this case, the estimated torque reading unit 41 reads estimated torque from the memory 33 with regard to each axis of a plurality of joints that are used for determining the installation mode and informs the determination unit 43 of the estimated torques. Whereas, the actual torque calculation unit 42 calculates actual torque with regard to each axis of the plurality of joints that are used for determining the installation mode and informs the determination unit 43 of the calculated actual torques. Then, the determination unit 43 calculates an error between the actual torque and the estimated torque for each axis of the plurality of joints used for determining the installation mode, and compares the calculated error with a predetermined threshold. Then, when the error is not less than the predetermined threshold with regard to a predetermined number of axes among the axes of the plurality of joints, the determination unit 43 may determine that the set installation mode and the actual installation mode are different. Alternatively, when the direction of the estimated torque and the direction of the actual torque are different with regard to the predetermined number of axes among the axes of the plurality of joints, the determination unit 43 may determine that the set installation mode and the actual installation mode are different. Note that the predetermined number is set to, for example, one, two, or a half of the number of the joints of the robot 2.

According to this variation, since an error between actual torque and estimated torque or difference of the directions between actual torque and estimated torque can be checked with regard to the axes of a plurality of joints, the installation mode determination device can more correctly determine whether the information that is set relating to the installation mode of the robot is correct or not.

According to another variation, the processor 34 may estimate the installation mode of the robot 2, based on actual torque.

Figure 6:
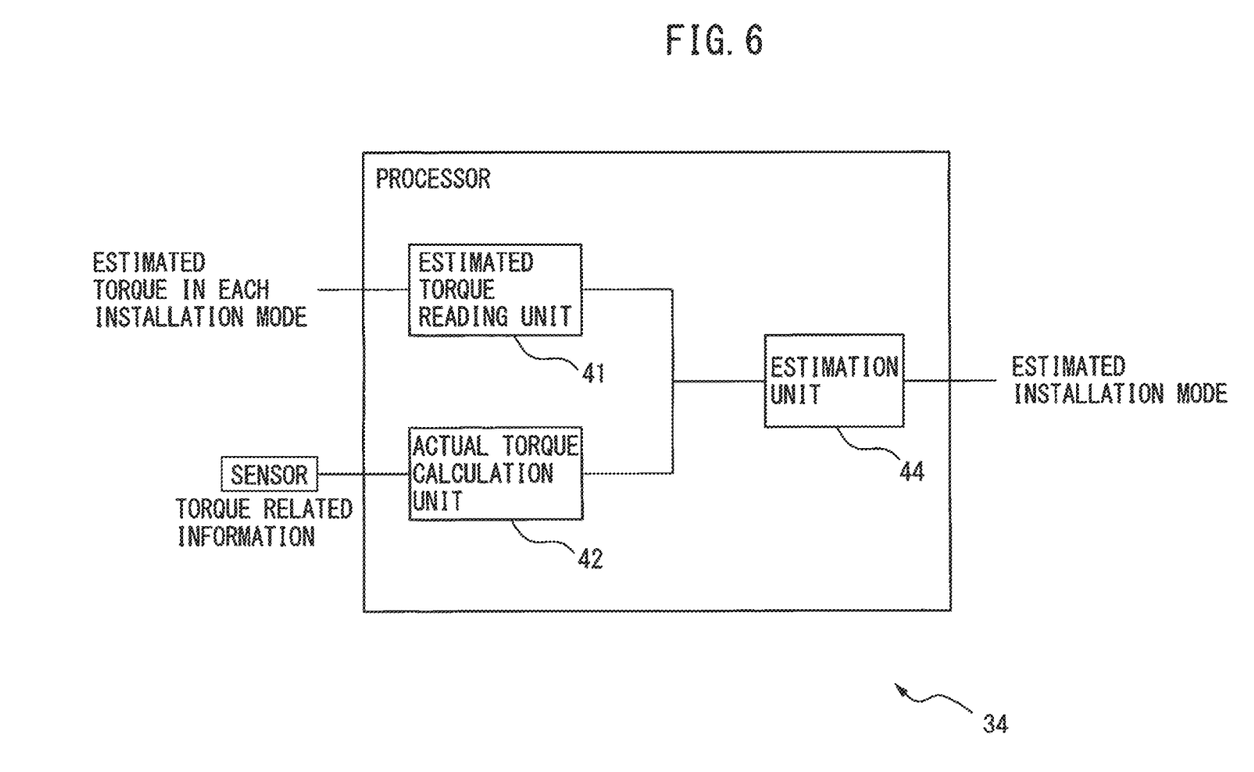
FIG. 6 is a functional block view of a processor of the control device according to a variation.

FIG. 6 is a functional block view of the processor 34 relating to installation mode determination processing according to this variation. The processor 34 includes an estimated torque reading unit 41, an actual torque calculation unit 42, and an estimation unit 44. These units of the processor 34 are, for example, functional modules that are realized by a computer program executed on the processor 34. Alternatively, these units may be implemented as a dedicated arithmetic circuit that is implemented by part of the processor 34. The variation illustrated in FIG. 6 is different compared with the above-described embodiment illustrated in FIG. 4 in that the processor 34 includes an estimation unit 44 instead of the determination unit 43 and in part of processing of the estimated torque reading unit 41. Thus, the following will describe these differences and relevant parts.

With regard to an axis of a joint used for determining the installation mode of the robot 2, the estimated torque reading unit 41 reads a value of estimated torque in each of installation modes applicable to the robot 2 from the memory 33 and delivers the values to the estimation unit 44.

The estimation unit 44 calculates an error between the estimated torque in each of the installation modes applicable to the robot 2 and actual torque. Then, the estimation unit 44 estimates an installation mode with the smallest error among the installation modes as an installation mode that is actually adapted to the robot 2. Alternatively, when an error between estimated torque and actual torque when the robot 2 is installed on a floor and an error between estimated torque and actual torque when the robot 2 is installed suspended from a ceiling are both not less than a predetermined threshold, the estimation unit 44 may determine that the robot 2 is installed with an inclination angle.

The estimation unit 44 causes the user interface 31 to display information representing the estimated installation mode. Then, when a user sets an installation mode of the robot 2, the processor 34 may highlight the estimated installation mode among the installation modes applicable to the robot 2. In this way, the processor 34 can suppress a user from falsely setting the installation mode of the robot 2.

Alternatively, the estimation unit 44 may store information representing the estimated installation mode in the memory 33. In such a case, when the processor 34 operates the robot 2, the processor 34 may refer to the information representing the estimated installation mode stored in the memory 33 and use control information corresponding to the estimated installation mode. For example, when the estimated installation mode is floor installation, to maintain the robot 2 in the stationary state, the processor 34 outputs a torque command to the servomotor that drives the axis of the joint 22, for rotating in a direction of generating force pulling the first arm 13 toward the side of the balancer 14. On the other hand, when the estimated installation mode is ceiling suspension installation, to maintain the robot 2 in the stationary state, the processor 34 outputs a torque command to the servomotor that drives the axis of the joint 22, for rotating in a direction of generating force pushing the first arm 13 away from the side of the balancer 14.

Figure 7:
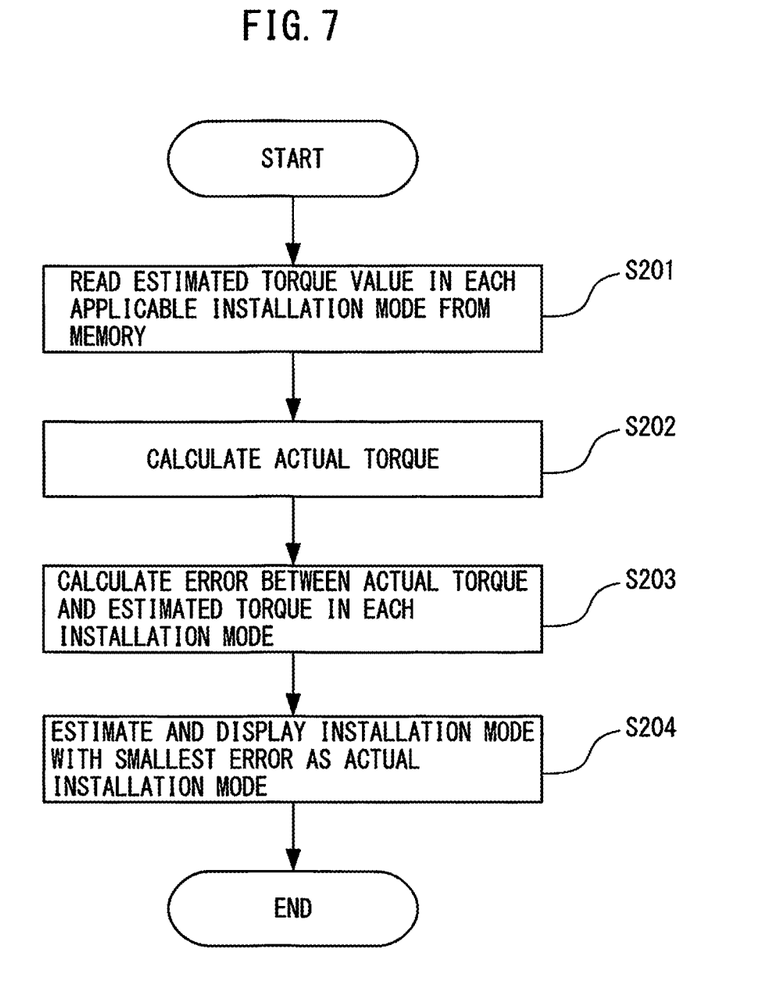
FIG. 7 is an operational flowchart of installation mode determination processing according to the variation.

FIG. 7 is an operational flowchart of installation mode determination processing according to this variation. The processor 34 executes installation mode determination processing in accordance with the following operational flowchart.

The estimated torque reading unit 41 reads a value of estimated torque from the memory 33 with regard to an axis of a joint that is used for determining an installation mode of the robot 2 for each of the installation modes applicable to the robot 2 (step S201). The actual torque calculation unit 42 calculates, with regard to the axis of the joint that is used for determining the installation mode of the robot 2, actual torque that is output from the servomotor 35 for actually maintaining the robot 2 in a stationary state (step S202).

The estimation unit 44 calculates an error between the estimated torque in each of the installation modes applicable to the robot 2 and the actual torque (step S203). Then, the estimation unit 44 estimates an installation mode with the smallest error among the installation modes as an installation mode that is actually adapted to the robot 2, and cause the user interface 31 to display information representing the estimated installation mode (step S204).

After step S204, the processor 34 ends the installation mode determination processing according to this variation. Note that the order of the processing of step S201 and the processing of step S202 may be switched.

According to this variation, the installation mode determination device can estimate the actual installation mode that is adapted to the automatic machine. As such, the installation mode determination device can prevent setting an installation mode that is different from the actual installation mode.

Further, when the estimation unit 44 determined that the robot 2 is installed with an inclination angle, the estimation unit 44 may estimate the inclination angle of the robot 2. For example, to estimate an inclination angle of the robot 2 with reference to the robot 2 in a ceiling suspension installment, the memory 33 stores in advance estimated torque that is required for maintaining the robot 2 in a stationary state for each inclination angle. Then, the estimation unit 44 calculates an error between the estimated torque for each inclination angle and the actual torque and estimates an inclination angle with the smallest error as the inclination angle of the robot 2. Note that the installation mode as a reference for calculating an inclination angle may be a floor installation.

According to this variation, the estimation unit 44 can estimate an inclination angle when the robot is installed with an inclination angle.

In the above-described embodiments and variations, when the robot 2 is stationary or while the robot 2 is operating, the estimated torque reading unit 41 may calculate estimated torque according to the actual position of the robot 2 in a set installation mode or in every installation mode or with an inclination angle. In such a case, the memory 33 stores in advance a variety of parameters used for calculating estimated torque, such as mechanical parameters and load information of each unit. Then, the estimated torque reading unit 41 reads the parameters from the memory 33. Further, the estimated torque reading unit 41 acquires information representing the current position from the robot 2 through the communication interface 32. Note that information representing the position of the robot 2 can be obtained, for example, as a measurement result of the rotation amount of the servomotor 35 measured by a position detector, such as an encoder, provided on the rotation axis or the like of the servomotor 35. Then, the estimated torque reading unit 41 may calculate estimated torque in accordance with a known method with regard to the set installation mode or every installation mode or the inclination angle, using information relating to the installation mode, the current position of the robot 2, the mechanical parameters read from the memory 33, the value of an inclination angle to be used in the estimation, and the like.

According to this variation, the processor 34 can determine the installation mode of the robot 2 with regard to an arbitrary position of the robot 2.

All examples and specific terms herein are intended for the purpose of teaching that facilitates understanding of the present invention and the concept contributed by the inventor for promoting the technique, and, therefore, should not be construed as being limited to the configuration of any examples, specific examples and conditions for indicating superiority and inferiority of the present invention. It should be understood that, although the embodiments of the present invention have been described in detail, the embodiments can be changed, replaced, or modified without departing from the spirit and scope of the present invention.

What is claimed is:

1. An installation mode determination device comprising:
a processor configured to:
acquire estimated torque that is required for maintaining a stationary state in which a position of an automatic machine that includes at least one axis that is driven by a servomotor is retained in a set installation mode among a plurality of installation modes applicable to the automatic machine,
calculate actual torque that is actually provided by the servomotor for maintaining the stationary state,
determine whether the set installation mode and an actual installation mode of the automatic machine are different or not, based on the estimated torque corresponding to the set installation mode and the actual torque, wherein the processor is configured to determine that the set installation mode and the actual installation mode of the automatic machine are different in response to an output direction of the servomotor corresponding to the estimated torque being different from an output direction of the servomotor corresponding to the actual torque, and
in response to determining a difference between the set installation mode and the actual installation mode of the automatic machine, restrict an operation of the automatic machine.

2. The installation mode determination device according to claim 1, wherein
the processor is configured to determine that the set installation mode and the actual installation mode of the automatic machine are different in response to an absolute value of a difference between the estimated torque and the actual torque being not less than a predetermined threshold.

3. An installation mode determination device, comprising:
a processor configured to:
acquire estimated torque that is required for maintaining a stationary state in which a position of an automatic machine that includes a plurality of axes that is driven by a servomotor is retained in a set installation mode among a plurality of installation modes applicable to the automatic machine,
calculate actual torque that is actually provided by the servomotor for maintaining the stationary state, determine whether the set installation mode and an actual installation mode of the automatic machine are different or not, based on the estimated torque corresponding to the set installation mode and the actual torque, and in response to determining a difference between the set installation mode and the actual installation mode of the automatic machine, restrict an operation of the automatic machine, wherein the processor is configured to determine that the set installation mode and the actual installation mode of the automatic machine are different in response to a number of axes with which an absolute value of a difference between the estimated torque and the actual torque being not less than a predetermined threshold among the plurality of axes, or a difference in a number of axes with which an output direction of the servomotor corresponding to the estimated torque and an output direction of the servomotor corresponding to the actual torque being not less than a predetermined number.

4. The installation mode determination device according to claim 1, further comprising:

a notification device including a user interface or a display configured to notify a determination result of whether the set installation mode and the actual installation mode of the automatic machine are different or not.

5. A non-transitory computer readable storage medium storing an installation mode determination computer program for causing a computer to execute:

acquiring estimated torque that is required for maintaining a stationary state in which a position of an automatic machine that includes at least one axis that is driven by a servomotor is retained in a set installation mode among a plurality of installation modes applicable to the automatic machine;

calculating actual torque that is actually provided by the servomotor for maintaining the stationary state;

determining whether the set installation mode and the actual installation mode of the automatic machine are different, based on the estimated torque and the actual torque corresponding to the set installation mode, wherein said determining comprises in response to an output direction of the servomotor corresponding to the estimated torque being different from an output direction of the servomotor corresponding to the actual torque, determining that the set installation mode and the actual installation mode of the automatic machine are different; and in response to determining a difference between the set installation mode and the actual installation mode of the automatic machine, restricting an operation of the automatic machine.

6. An installation mode determination device, comprising:

a sensor configured to measure torque-related information that is output from a servomotor;

a processor configured to:

acquire, for each of a plurality of installation modes applicable to an automatic machine that includes at least one axis that is driven by the servomotor, estimated torque that is required for maintaining a stationary state in which a position of the automatic machine is retained, calculate actual torque that is actually provided by the servomotor for maintaining the stationary state, based on the torque-related information by the sensor, calculate, for each of the plurality of installation modes, an absolute value of a difference between the estimated torque in the installation mode and the actual torque, and estimate an installation mode with a smallest absolute value of the difference among the plurality of installation modes as an actual installation mode of the automatic machine; and a notification device including a user interface or a display, and configured to notify the estimated installation mode.

7. The installation mode determination device according to claim 6, wherein the processor is further configured to calculate an inclination angle of the automatic machine with reference to the automatic machine installed in accordance with a predetermined installation mode, based on a proportion of the actual torque in relation to the estimated torque in the predetermined installation mode among the plurality of installation modes.

8. A non-transitory computer readable storage medium storing an installation mode determination computer program for causing a computer to execute:

causing a sensor to measure torque-related information that is output from a servomotor;

acquiring, for each of a plurality of installation modes applicable to an automatic machine that includes at least one axis that is driven by the servomotor, estimated torque that is required for maintaining a stationary state in which a position of the automatic machine is retained;

calculating actual torque that is actually provided by the servomotor for maintaining the stationary state, based on the measured torque-related information by the sensor;

calculating, for each of the plurality of installation modes, an absolute value of a difference between the estimated torque in the installation mode and the actual torque;

estimating an installation mode with a smallest absolute value of the difference among the plurality of installation modes as an actual installation mode of the automatic machine; and notifying the estimated installation mode via a notification device including a user interface or a display.

* * * * *